(12) United States Patent
Munn et al.

(10) Patent No.: US 11,801,991 B1
(45) Date of Patent: Oct. 31, 2023

(54) ADVANCED AERIAL, INTERNAL CARRIAGE-COMPATIBLE TRAVEL POD

(71) Applicant: KIHOMAC, Reston, VA (US)

(72) Inventors: Trey Munn, Clinton, UT (US); David Albert, Syracuse, UT (US); Adam Grimm, Aldie, VA (US)

(73) Assignee: KIHOMAC, Inc., Vienna, VA (US)

( * ) Notice: Subject to any disclaimer, the term of this patent is extended or adjusted under 35 U.S.C. 154(b) by 21 days.

(21) Appl. No.: 17/724,427

(22) Filed: Apr. 19, 2022

(51) Int. Cl.
*B65D 88/14* (2006.01)
*B65D 90/00* (2006.01)
*B65D 90/22* (2006.01)

(52) U.S. Cl.
CPC ........... *B65D 88/14* (2013.01); *B65D 90/006* (2013.01); *B65D 90/008* (2013.01); *B65D 90/22* (2013.01)

(58) Field of Classification Search
CPC .... B65D 2251/0068; B65D 2251/0006; B65D 2251/0003; B65D 35/44; B65D 88/121; B65D 88/122; B65D 88/123; B65D 88/124; B65D 88/125; B65D 88/126; B65D 88/127; B65D 88/128; B65D 88/129; B65D 88/04; B65D 88/06; B65D 88/08; B65D 88/10; B65D 88/12; B65D 88/022; B65D 88/025; B65D 88/027; B65D 88/02; B65D 88/14; B65D 90/006; B65D 90/008; B65D 90/22
See application file for complete search history.

(56) References Cited

U.S. PATENT DOCUMENTS

| | | | | |
|---|---|---|---|---|
| 3,677,212 A | * | 7/1972 | Gregoire | B63B 1/14 114/316 |
| 3,700,189 A | * | 10/1972 | Timperman | B64C 29/0025 244/12.4 |
| 4,166,408 A | * | 9/1979 | Wetzel | F41A 9/81 89/33.02 |
| 6,360,670 B1 | * | 3/2002 | Schlienger | B61C 11/06 104/283 |
| 2014/0306809 A1 | * | 10/2014 | McIntyre | G01M 3/005 340/10.42 |
| 2015/0128823 A1 | * | 5/2015 | Akcasu | F42B 10/56 102/501 |
| 2022/0111083 A1 | * | 4/2022 | Johnson | A61L 2/10 |

* cited by examiner

*Primary Examiner* — Kareen K Thomas
(74) *Attorney, Agent, or Firm* — Kirby Drake

(57) ABSTRACT

A composite pod body that is compatible with the internal carriage mounting of an aerial vehicle for stowage of equipment or other items during long term aerial travel or deployment. The pod system may have large access doors with quick release latches and removable end caps for ergonomic access and versatility of stowage. The pod design may maximize the usable volume of the internal carriage. Further, standard NATO lug spacing may be utilized to ensure military compatibility. The pod may also have anti-roll or stabilization feet integrated with the body to ensure safety. The composite body may be lightweight when compared to legacy generation pods.

20 Claims, 2 Drawing Sheets

ADVANCED AERIAL, INTERNAL CARRIAGE-COMPATIBLE TRAVEL POD

CROSS-REFERENCE TO RELATED APPLICATION

The present application is a non-provisional of, and claims priority to, U.S. Patent Application No. 63/200,195, filed Feb. 19, 2021, the disclosure of which is incorporated by reference in its entirety.

FIELD OF THE DISCLOSURE

The present disclosure generally relates to travel pods, and more particularly to aerial, internal carriage-compatible travel pods.

BACKGROUND

A pod is a detachable or self-contained unit on an aircraft, spacecraft, vehicle, or vessel, having a particular function. A cargo or travel pod is commonly utilized for stowage of cargo, equipment, baggage, or other items necessary for sustaining travel or deployment wherein the vehicle performing the travel does not have the otherwise necessary cargo or stowage space inherently required. Devices performing this function will herein be referred to as travel pods.

Travel pods for aerial vehicles, such as fighter aircraft, are commonly mounted to hard point pylons and external carriages requiring compatibility with the MIL-STD-8591 interface. Small aerial vehicles, as opposed to cargo transport aircraft, typically have minimal internal space for stowage. Externally mounted travel pods provide the extra space necessary.

External travel pods must be aerodynamic in profile to mitigate any impact to the aerodynamic performance of the aircraft. This results in long tapered ends which add weight, but the internal space is not ergonomically usable. The current 4th generation military travel pod is the MXU-648 which is authorized for use with the A-10, F-15, F16, and AV-8 aircraft.

Common problems with these travel pods are the same as the older generation of aircraft. Structurally, these travel pods utilize aluminum construction, welding, and a variety of dissimilar material fasteners for construction requiring specialized coatings and finishes, some of which are environmentally hazardous like cadmium plating and chromium compound treatments. This results in necessary preventative maintenance to mitigate corrosion and address wear and tear from the environment. Due to the nature of construction, these travel pods only have a weight to capacity ratio of 3:1. Due to the nature of the profile, the travel pods have limited usable space internally, as well as limited space to mount doors for access. Typically, there is only one door.

These travel pods are also incompatible with 5th generation military aircraft which do not have external hardpoint pylons and carriages. These aircraft have special internal bays where the mounting carriages are integrated and are designed to be compatible with certain standard size ordnance devices. The current travel pods do not fit these profiles.

SUMMARY

Embodiments of the present disclosure may provide an aerial travel pod assembly comprising: a body with a first end portion having a first end cap, a second end portion having a second end cap, and a central axis extending from the first end portion to the second end portion; a plurality of access doors dispersed along a length of the body; an anti-roll stabilization system integrated along a base of the body at more than one position between the first end portion and the second end portion; an integrated configurable tie down system within the body extending from the first end portion to the second end portion; and an external mounting interface that may be compatible with an internal carriage/bay of an aerial vehicle. The body may be comprised of a lightweight composite material, which may comprise at least one of a carbon fiber, a carbon fiber reinforced plastic, poly-para-phenylene terephthalamide, a glass-reinforced plastic, and a glass-fiber reinforced plastic. The tie down system may be integrated with a base of an interior cavity of the body. The internal cavity of the body may be fully accessible. The first end cap and the second end cap may be removable to allow ergonomic ingress to an internal cavity of the body. The first end cap and the second end cap may be comprised of light-weight composite material. The first end cap and the second end cap may further comprise reinforced handles, wherein the first end cap and the second cap may be configured as lift points for the body. The plurality of access doors may be comprised of a lightweight composite material. The plurality of access doors may be of different sizes to allow for ergonomic stowage of maximum sized cargo. The plurality of access doors may be secured by at least one latch. The at least one latch may be a push-release and/or a quick-release latch. The at least one latch may be configured to be oriented in more than one direction and installed at more than one point on each of the plurality of access doors. The tie down system also may include a plurality of configurable tie down rails compatible with a plurality of tie down pins. The plurality of tie down pins may be compatible with ratchet straps. The plurality of tie down pins may be reconfigurable after each use. The anti-roll stabilization system may extend beyond an outer surface of the body, and wherein roll, side, or unintended movement of the body may be impeded when the pod assembly is not connected to the internal carriage/bay of the aerial vehicle. The external mounting interface may also include a strongback integrated with the body. The strongback may further include a plurality of lug hard points configured to install to the internal carriage/bay of the aerial vehicle through a plurality of mounting lugs. A spacing of the plurality of mounting lugs may be compatible with NATO standards.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a composite or carbon fiber pod body that may be compatible with the internal carriage mounting of an aerial vehicle. The discussion of the structural approach will highlight the performance improvements over the current art, such as usable volume, weight, and capacity. Another aspect of the present disclosure relates to the ergonomic design and access points facilitating the versatility of use for stowage, safety, and durability.

Figure 1:
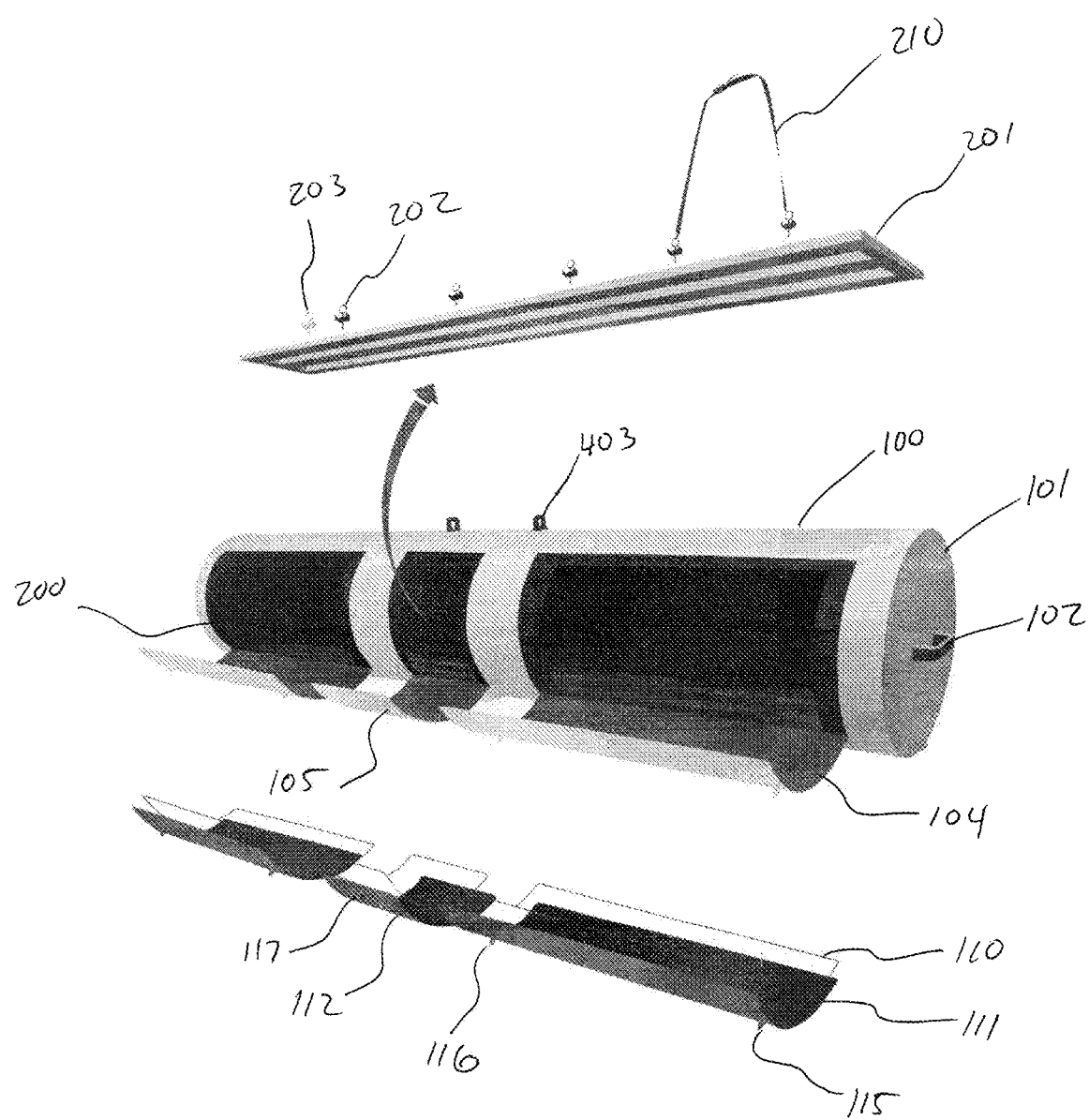
FIG. 1 depicts an exploded view of an advanced travel pod assembly according to an embodiment of the present disclosure.
Figure 2:
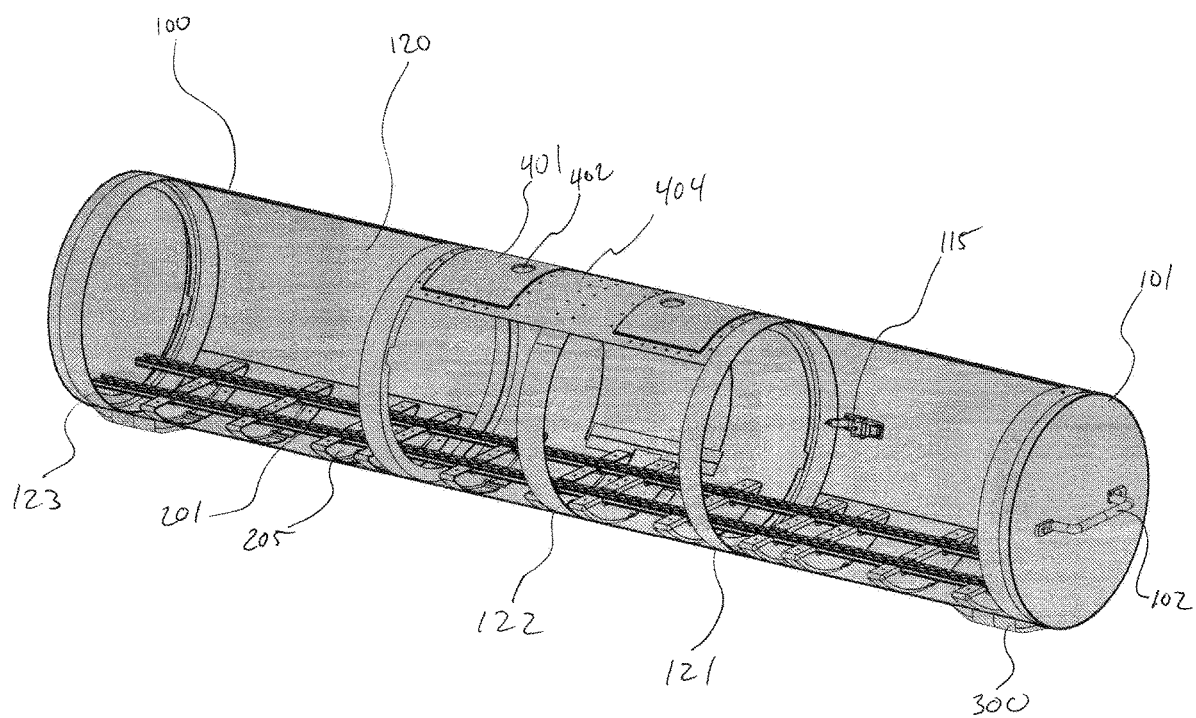
FIG. 2 depicts a transparent perspective view depicting an example configuration of the advanced travel pod assembly according to an embodiment of the present disclosure.

FIGS. 1-2 show views of advanced travel pod assembly 100 with integrated configurable tie down system 200 and external mounting interface 400 for pod assembly 100 according to an embodiment of the present disclosure. Pod assembly 100 may include main pod body 120 having inner surface 110 and outer surface 120. Pod body 120 is shown in FIG. 1 as having a generally tubular outer shape; however, the pod body may have other shapes without departing from the present disclosure.

Pod body 120 may comprise a composite and/or a composite substrate. A composite for use according to embodiments of the present disclosure may include, but is not limited to, any one or a combination of carbon fiber, carbon fiber reinforced plastic, poly-para-phenylene terephthalamide, glass-reinforced plastic, and/or glass-fiber reinforced plastic. Body 120 may further include an epoxy, polyester, vinyl ester, and/or nylon. Pod body 120 may be formed as a molded fiber reinforced plastic, layered and/or laminated substrate or a molded thermoplastic matrix, for example. Further, the interior of body 120 may include reinforcement ring 121, 122, 123 proximal to the inner surface of pod body 120, for example, for strengthening high stress areas of the body. Reinforcement ring 121, 122, 123 may be formed of aluminum, titanium, steel, and/or an alloy of the aforementioned materials, for example. Reinforcement ring 121, 122, 123 and the inner pod body may include additional features and/or processing to improve the interface between materials. Non-limiting examples of additional features and/or processing may include anodization and/or the addition of a separator between the pod body and reinforcement ring 121, 122, 123 (such as a fiberglass scrim), which may be added to prevent corrosion or galling between the reinforcement rings and the pod body. Reinforcement ring 121, 122, 123, alternatively may comprise any of the aforementioned materials for example.

Pod assembly 100 may further include end cap 101 and handle 102. Reinforcement ring 123 may further include at least one means of removal and secure retention for end cap 101. Pod assembly 100 may further include one or more access doors, such as large access door 104 and/or standard access door 105. Access doors 104, 105 may comprise of the aforementioned composites similar to pod body 120, for example. Door outer surfaces 111, 112 and end cap 101 may be flush with pod body outer surface 120. Access doors 104, 105 may also have the same reinforced inner lining as the pod body interior 110. The access doors 104, 105 may permit the ergonomic ingress of cargo that is the maximum size to fit within the interior of pod assembly 100.

Further, the abovementioned access doors may have one or more push or quick release latches 115, 116, 117 for quick access to release and open the access doors. Latches 115, 116, 117 can be in a variety of configuration including opposite 116 and central 117 oriented. Access doors 104, 105 are not limited to latches as shown, and may provide a similar function in the form of a slider, button, or rocker, for example. Access doors 104, 105 may also be hinged or fully detachable. Reinforcement split ring 122 may be used within pod body 120 to strengthen the body where access door 104, 105 is installed without interfering with the function of the access door.

Pod assembly 100 may further include integrated configurable tie down system 200 integrally mounted to the interior base of body 120. Supporting rail brace 205 may be integrally molded as a part of pod assembly 100 or may, for example, be bonded or otherwise attached to pod body 120 or another portion of pod assembly 100. Supporting rail brace 205 may be formed of a composite that is the same as that of much of the remainder of pod assembly 100 or may be formed of a different material from pod assembly 100. Since the mounting portion may be mounted to aluminum configurable tie down rail 201, it may be preferable to use a material similar in electrode potential or that is substantially non-conductive to prevent galvanic corrosion therebetween. Supporting rail brace 205 may comprise at least one of a carbon fiber, carbon fiber reinforced plastic, poly-para-phenylene terephthalamide, glass-reinforced plastic, glass-fiber reinforced plastic, polyether ether ketone, reinforced polyether ether ketone, polyetherimide, reinforced polyetherimide, and/or reinforced nylon, for example. The composite may further include epoxy, polyester, vinyl ester, and/or nylon. The use of polyether ether ketone, reinforced polyether ether ketone, polyetherimide, reinforced polyetherimide, and/or reinforced nylon may prevent corrosion between supporting rail brace 205 and metallic configurable tie down rail 201, for example. Supporting rail brace 205 may further be either molded as a fiber reinforced plastic and/or be comprised of a layered or laminated substrate.

Configurable tie down rail 201, to which tie down pins 202 may be mounted, may extend with pod body 120 from a first end position to a second end position, and may be accessible by ingress through end caps 101. Configurable tie down rail 201 may allow the tie down pins to be repositioned and reconfigured 203 after each use. Tie down pins 202 may be a variety of mechanical formats, such as eye hooks, loops, clasps, retractable clips, or other common mechanical interfaces, for example. Tie down pins 202 may allow for a variety of mechanical cargo retention methods, such as ratchet strap system 210, for example.

Anti-roll or stabilizing system 300 may be integrated into the base of pod body 120. Anti-roll system 300 may further extend beyond the surface of pod body 120, where the extending features may make direct contact with a ground or otherwise resting surface when pod assembly 100 is not installed in an aerial vehicle. Anti-roll system 300 may be placed along the length of pod body 120 or any position along the length of the pod body between end caps 101. Anti-roll system 300 may impede the unintended movement of pod assembly 100: roll, slide, skid, or other form of lateral or rotary motion deviating from pod assembly 100 intended static state position. Anti-roll system 300 may be passively or actively engaged and operate when pod assembly 100 is being accessed or stored outside of an aerial vehicle.

External mounting interface 400 may include a strongback which may have external portion 401 that extends beyond pod body 120, and internal portion 404, which interfaces with inner reinforced lining 110. Strongback portions 401, 404 may be formed of aluminum, titanium, steel, and/or an alloy of the aforementioned materials, for example. The integration with pod body 120 may include additional features and/or processing to improve the interface between materials as aforementioned. External strongback portion 401 may further include lug hard points 402, which provide installation to aircraft mounting lugs 403. External mounting interface 400 may install to the internal carriage of an aerial vehicle by mounting lugs 403. The spacing of mounting lugs 403 may be compatible with NATO standards.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An aerial travel pod assembly comprising:
   a body with a first end portion having a first end cap, a second end portion having a second end cap, and a central axis extending from the first end portion to the second end portion;
   a plurality of access doors dispersed along a length of the body;
   an anti-roll stabilization system integrated along a base of the body at more than one position between the first end portion and the second end portion;
   an integrated configurable tie down system within the body extending from the first end portion to the second end portion; and
   an external mounting interface that is compatible with an internal carriage/bay of an aerial vehicle.

2. The aerial travel pod assembly of claim 1, wherein the body is comprised of a lightweight composite material.

3. The aerial travel pod assembly of claim 2, wherein the lightweight composite material comprises at least one of a carbon fiber, a carbon fiber reinforced plastic, poly-paraphenylene terephthalamide, a glass-reinforced plastic, and a glass-fiber reinforced plastic.

4. The aerial travel pod assembly of claim 1, wherein the tie down system is integrated with a base of an interior cavity of the body.

5. The aerial travel pod assembly of claim 1, wherein an internal cavity of the body is fully accessible.

6. The aerial travel pod assembly of claim 1, wherein the first end cap and the second end cap are removable to allow ergonomic ingress to an internal cavity of the body.

7. The aerial travel pod assembly of claim 1, wherein the first end cap and the second end cap are comprised of light-weight composite material.

8. The aerial travel pod assembly of claim 1, the first end cap and the second end cap further comprising:
   reinforced handles, wherein the first end cap and the second cap are configured as lift points for the body.

9. The aerial travel pod assembly of claim 1, wherein the plurality of access doors are comprised of a lightweight composite material.

10. The aerial travel pod assembly of claim 1, wherein the plurality of access doors are of different sizes to allow for ergonomic stowage of maximum sized cargo.

11. The aerial travel pod assembly of claim 1, wherein the plurality of access doors are secured by at least one latch.

12. The aerial travel pod assembly of claim 11, wherein the at least one latch is a push-release and/or a quick-release latch.

13. The aerial travel pod assembly of claim 11, wherein the at least one latch is configured to be oriented in more than one direction and installed at more than one point on each of the plurality of access doors.

14. The aerial travel pod assembly of claim 1, the tie down system further comprising:
   a plurality of configurable tie down rails compatible with a plurality of tie down pins.

15. The aerial travel pod assembly of claim 14, wherein the plurality of tie down pins are compatible with ratchet straps.

16. The aerial travel pod assembly of claim 14, wherein the plurality of tie down pins are reconfigurable after each use.

17. The aerial travel pod assembly of claim 1, wherein the anti-roll stabilization system extends beyond an outer surface of the body, and wherein roll, side, or unintended movement of the body is impeded when the pod assembly is not connected to the internal carriage/bay of the aerial vehicle.

18. The aerial travel pod assembly of claim 1, the external mounting interface further comprising:
   a strongback integrated with the body.

19. The aerial travel pod assembly of claim 18, the strongback further comprising:
   a plurality of lug hard points configured to install to the internal carriage/bay of the aerial vehicle through a plurality of mounting lugs.

20. The aerial travel pod assembly of claim 19, wherein a spacing of the plurality of mounting lugs is compatible with NATO standards.

* * * * *